Nov. 6, 1928. J. F. SEITZ Re. 17,125
METHOD OF MAKING MOTION PICTURE FILMS
Original Filed Dec. 12, 1922 4 Sheets-Sheet 1
Fig. 1.
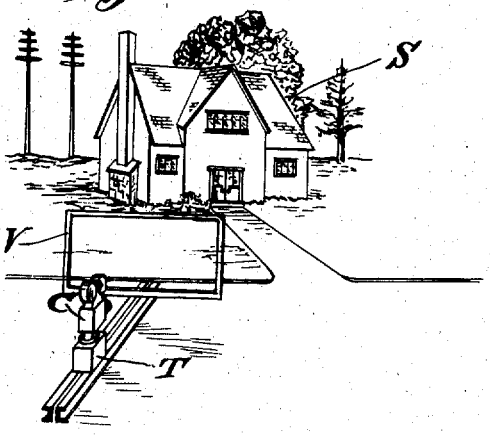
Fig. 2.
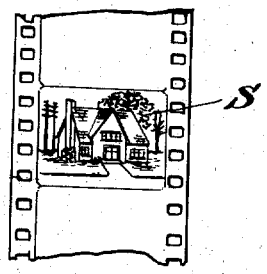
Fig. 3.
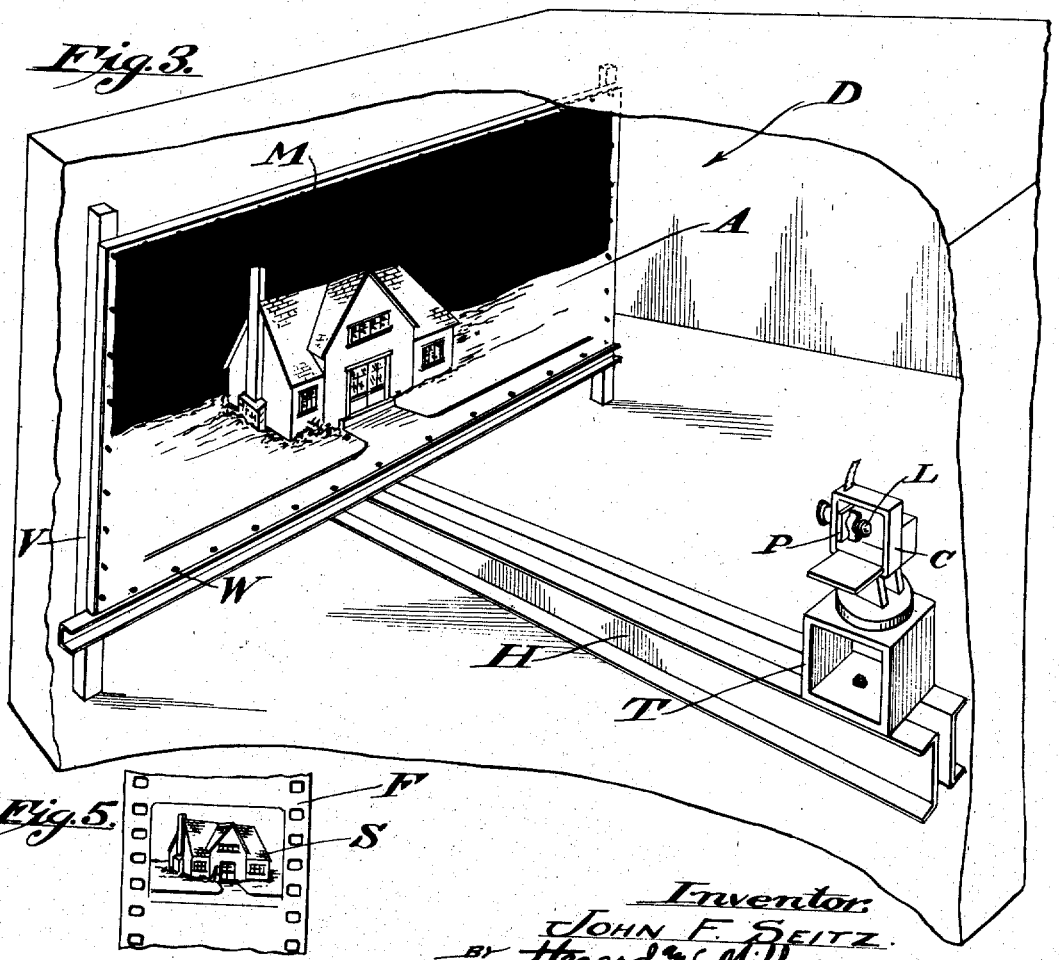
Fig. 5.
Inventor:
JOHN F. SEITZ.
By Hazard and Miller
Att's.

Nov. 6, 1928. J. F. SEITZ Re. 17,125

METHOD OF MAKING MOTION PICTURE FILMS

Original Filed Dec. 12, 1922 4 Sheets-Sheet 2

Inventor
JOHN F. SEITZ
BY Hazard and Miller
Att'ys

METHOD OF MAKING MOTION PICTURE FILMS

Original Filed Dec. 12, 1922 4 Sheets-Sheet 3

Inventor:
JOHN F. SEITZ
BY Hazard & Miller
Attorneys

Nov. 6, 1928. J. F. SEITZ Re. 17,125

METHOD OF MAKING MOTION PICTURE FILMS

Original Filed Dec. 12, 1922 4 Sheets-Sheet 4

Inventor:
JOHN F. SEITZ
By Hazard & Miller
Attorneys

Reissued Nov. 6, 1928. Re. 17,125

UNITED STATES PATENT OFFICE.

JOHN F. SEITZ, OF HOLLYWOOD, CALIFORNIA.

METHOD OF MAKING MOTION-PICTURE FILMS.

Original No. 1,576,854, dated March 16, 1926, Serial No. 606,400, filed December 12, 1922. Application for reissue filed November 28, 1927. Serial No. 236,353.

My invention relates to multiple exposure work in photography, and is more particularly adapted for motion pictures.

It is the primary object of this invention to provide a method of producing mats which will register with the utmost accuracy upon sensitized film. To this end, a picture including a desired composite portion is projected from the camera upon a screen, the undesired portion being blocked out by employing a non-actinic material. For example a picture having a desired portion together with an undesired portion is to be photographed, it being necessary to include the exact portion wanted and to exclude exactly what is not wanted. It will be apparent that some method of performing these steps accurately must be provided, and it is an object of this invention to provide a method to accomplish such results.

It is another object of this invention to provide for the effective combination of two or more component scenes in a composite picture by making exposures of a sensitized film employing mats of the character above described.

This application is a reissue application of Patent No. 1,576,854 dated March 16, 1926.

Figure 4:
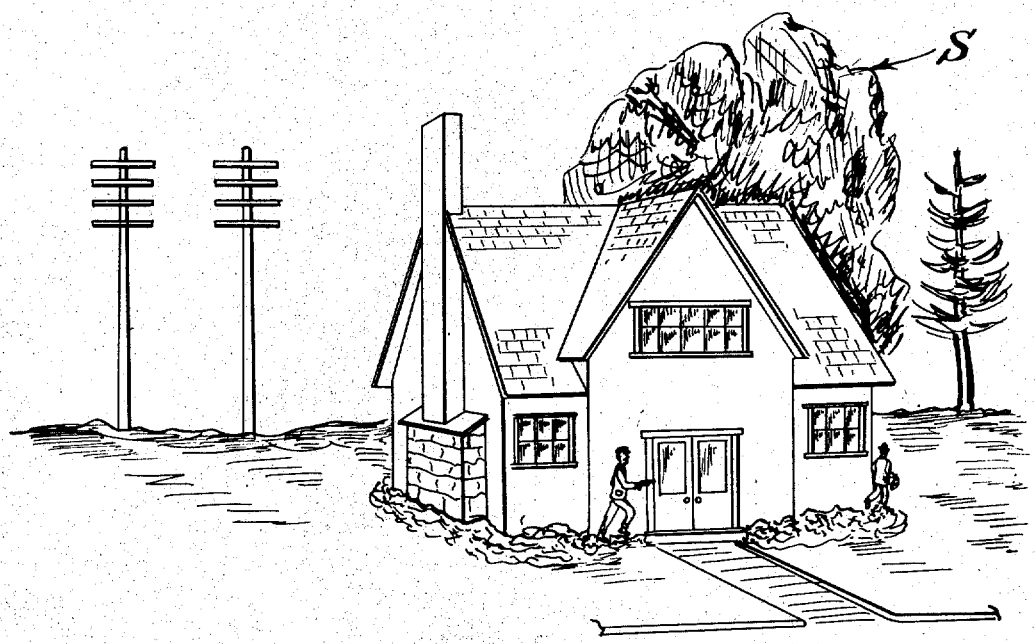
Figure 4:
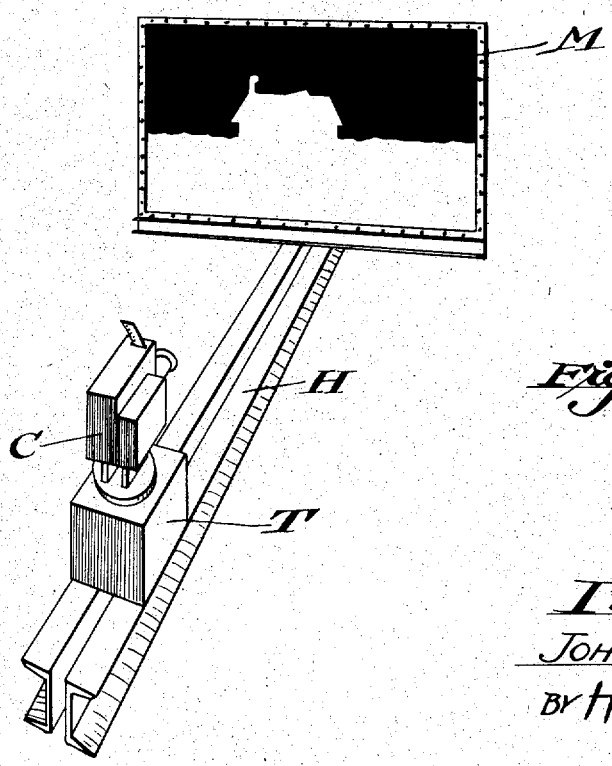
Figure 6:
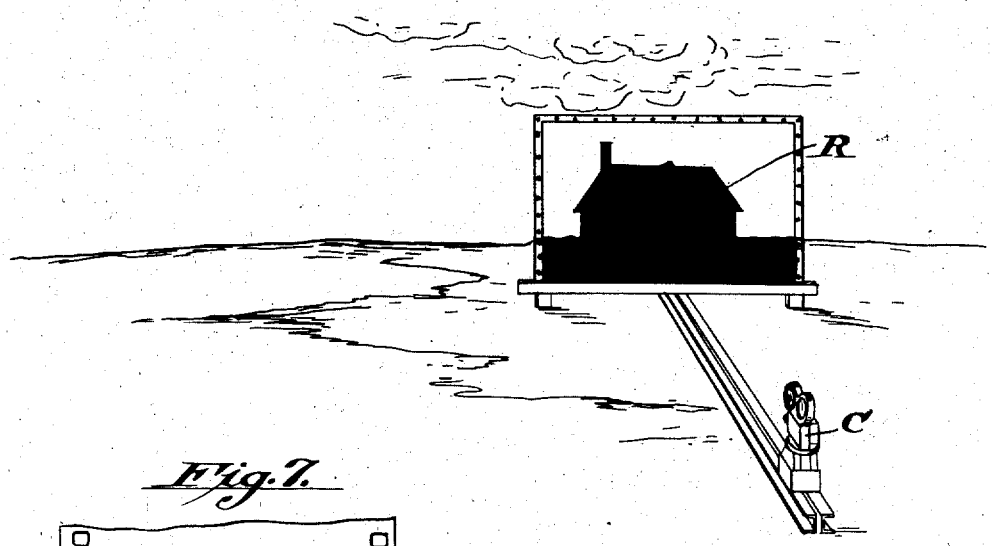
Figure 7:
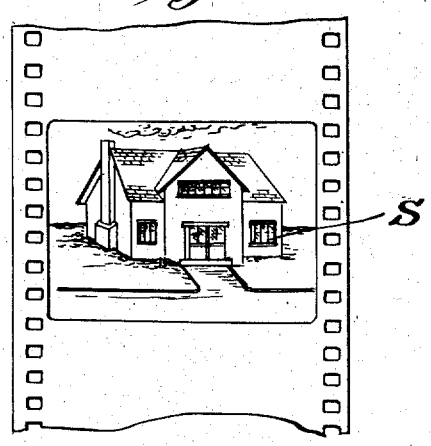
Figure 8:
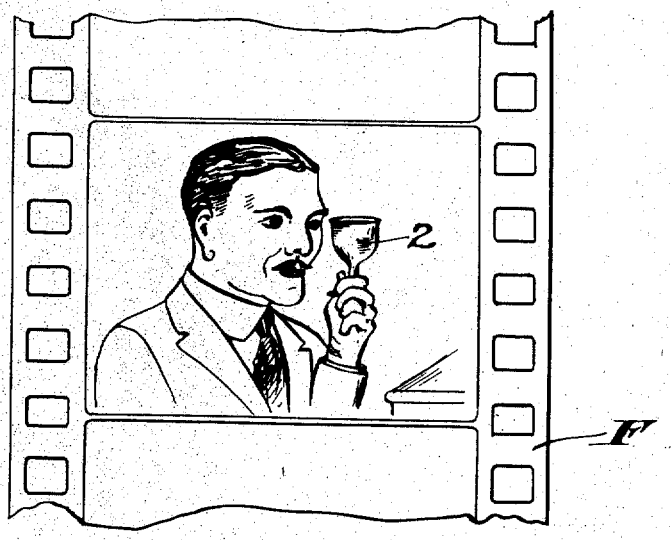
Figure 8:
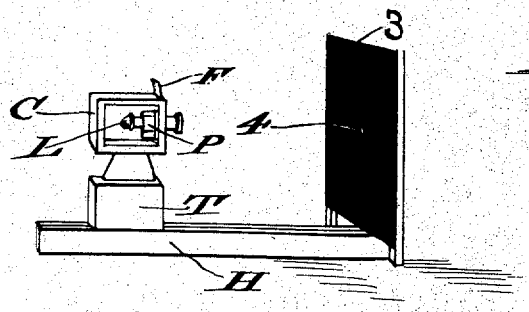
Figure 9:
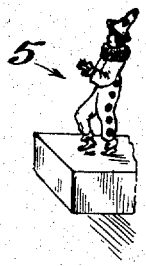
Figure 10:
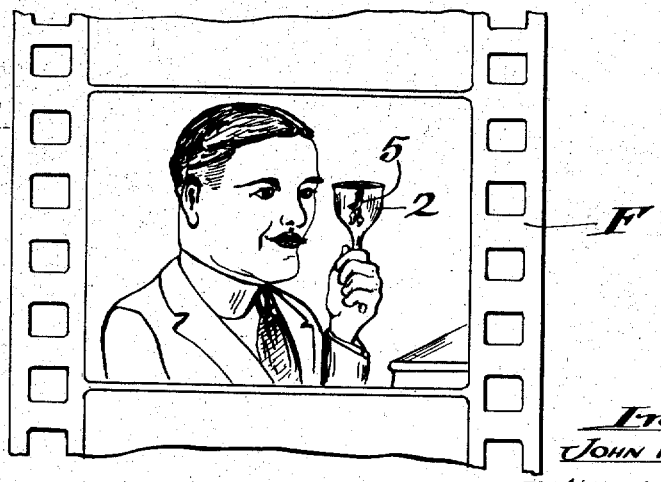

In the accompanying drawings,

Fig. 1 is a perspective showing a scene of which a negative is taken in the first step in my process; Fig. 2 is a view showing a section of developed picture of the scene taken in the first step; Fig. 3 is a view showing the picture being projected on a sheet, in a dark house, and the making of a mat thereon; Fig. 4 shows the first exposure on the scene and the located mat to cut out the background and sky; Fig. 5 is a view showing the result of the film strip exposure; Fig. 6 is a perspective showing the second step of film exposure on the complementary mat to take a sky or background; Fig. 7 is a view of a portion of the developed film after the second exposure; Fig. 8 shows a close-up picture to be combined with a subsequent exposure; Fig. 9 shows the step of making the second exposure to form an insert; and Fig. 10 shows the picture including the insert.

Referring particularly to Figs. 1 to 7, a negative of a scene S at which action is to take place is taken by a camera C which is set on location in a substantially fixed position. A frame of this negative is then inserted into an auxiliary aperture plate P in the camera, and this frame is projected in a dark house D upon a sheet A of suitable material such as glass, sheet metal, cardboard or the like through the same lens used in taking the original scene by a lamp L also located in the camera. The dark house may be built around the camera on location.

While the scene is projected upon the screen or sheet as shown in Fig. 3, any part which is not desired to appear in the final picture is blocked out as by giving a non-actinic coat to form a mat, the part of the scene other than the mat is made transparent. In the case of glass, if the latter is transparent no additional treatment of the screen is necessary. In the case of an opaque sheet the portion to be made transparent is cut out and discarded. The auxiliary plate and lamp are then removed from the camera, and the mat will mask that part of the scene not desired. The scene is then photographed with the mat in position by running a film which results in producing a picture in which the mat will cause such parts of the film to appear blank as shown in Fig. 5.

The first or primary mat M functions to cut out the upper area of the scene which is filmed, so that the uncovered or blank part is photographed with or without animate figures as may be desired.

To complete the exposure of the film, a reverse or complementary mat R is made which has an edge matching the irregular edge of the first mat M. The complementary mat R is then set in position in front of the camera and in relation to any desired second scene as a background or skyline, Fig. 6. The undeveloped or light impressed film is then a second time exposed on the second scene, which results in a composite picture, namely, scene of Fig. 1 and scene of Fig. 6; but, in each scene photographed, complemental mats of reverse positions are separately used exteriorly of the camera.

It is essential that the camera and mats be maintained in the same relative positions, and to this end the sheet upon which the scene is projected and from which the mats are formed may be firmly pinned to a vertical frame V by pins W. This frame is secured to a horizontal frame H upon which the camera is adjustably mounted on a stand T.

It should be noted that it is not necessary to maintain the camera in the same position during the making of the first and second exposure. The reverse or complementary mat need not be spaced from the camera C at the same distance as the first or primary mat M.

While I have shown and described one practical embodiment of my process, it will be readily understood that various other scenes and arrangements of scenes may be made without departing from the spirit of the invention as claimed.

For illustration, my method may be used to first take a film F of a "close-up" as shown in Fig. 8 of the profile of a person holding a tumbler. A scene may be made to appear in the bowl of the tumbler, and that I accomplish by fixing the camera C on its support H and projecting an image therefrom, by use of the lamp L, onto a screen or paper 3 placed in front of the camera. Then a portion of the paper is cut out as at 4 at that portion of the projected image in which the insert is to appear.

The film F with its "take" undeveloped is then placed in the camera and again run. This second exposure will include such scene 5 as may be visible through the hole 4 made in the "mat" or barrier 3.

The term "camera" is used throughout this specification in its broad sense and includes projection printers. Thus, the camera may be used as a projector. The term "blocking out" has been used to mean occluding the passage of light rays or their reflection. The term "scene" has been used to include paintings, drawings, and natural or artificial objects of every kind known in the art of photography and motion pictures.

What I claim is:—

1. In the art of making composite motion pictures the steps of making a picture of a scene having a desired component, and blocking out thereon all but the desired component to produce a blocked picture, projecting the blocked picture upon a screen, outlining a mat thereon complementary to and matching the desired component by the aid of said projected blocked picture so as to optically register with and mask the desired component.

2. In the art of making composite motion pictures, the steps of making a picture of a scene having a desired component, and blocking out thereon all but the desired component to produce a blocked picture, projecting the blocked picture upon a screen, outlining a mat thereon complementary to and matching the desired component by the aid of said projected blocked picture so as to optically register with and mask the desired component, making a light impression of said blocked component on a film, making a second light impression of a supplementary component on said film while maintaining said mat in masking position, and developing said film.

3. In the art of making composite motion pictures, the method of making a mat comprising making a picture having a component portion of a desired composite picture, projecting said picture upon a screen, blocking out on said screen all but the desired projected component, and making said unblocked portion transparent so as to produce a mat from said screen.

4. In the art of making composite motion pictures, the method comprising creating a scene including a component portion of a desired composite picture, photographing with a camera said scene, projecting such photographed picture upon a screen, blocking out on said screen all but the projected component and making said unblocked portion transparent so as to produce a mat from said screen, maintaining said camera and mat in exactly the same position relative to said scene as when photographed, and photographing with said camera upon a sensitized film said scene with said mat in position.

5. A method of making composite motion pictures comprising making a transparency of a scene, casting an image therefrom onto a screen, blocking out on said screen by aid of the projected image all but a first component to produce a first mat, making a first exposure of the scene while the first mat is in the same optical relation to the transparency; making a second mat by the same process, but reverse to the first mat to cover the first component, and making a second exposure with the second mat in masking position.

In testimony whereof I have signed my name to this specification.

JOHN F. SEITZ.